Sept. 29, 1970        G. F. CONN        3,531,161

BACK HOE SAW ATTACHMENT

Filed Feb. 27, 1967

INVENTOR.
GILBERT F. CONN

BY

*William J. Ruano* his ATTORNEY

United States Patent Office 3,531,161
Patented Sept. 29, 1970

3,531,161
BACK HOE SAW ATTACHMENT
Gilbert F. Conn, Bridgeville, Pa.
(1314 Old Meadow Road, Pittsburgh, Pa. 15241)
Filed Feb. 27, 1967, Ser. No. 623,501
Int. Cl. E02f 3/32; E21c 37/00
U.S. Cl. 299—18                                    2 Claims

ABSTRACT OF THE DISCLOSURE

A saw attachment for an earth moving machine, such as a back hoe, which has one or two saw blades with large teeth removably fastened to the sides of the bucket for sawing strips of frozen ground and other uses.

---

This invention relates to a novel attachment for a bucket of an earth digging machine, such as a back hoe. More specifically, this invention relates to a pair of parallel saw blades attached to the sides of a back hoe bucket for sawing strips of frozen soil or turf.

The back hoe machine is an earth digging machine which uses a bucket with sharp, teeth-like projections at one end to penetrate the soil as the initial step in scooping out a trench.

An outstanding disadvantage of this machine is that when the soil is hard or frozen, the soil surface is very difficult or impossible to penetrate with the teeth of the back hoe bucket. This condition often results in the postponement of digging until the weather conditions change. One attempted solution to this problem has been to penetrate the soil by using a jackhammer to punch holes in the soil, but this solution is highly inefficient since it is very time consuming and requires considerable man hours of labor under the most adverse weather conditions.

Another disadvantage of using the back hoe machine in cold weather is that after the soil has been uncovered, the subsoil is then exposed to the weather, freezes and becomes unworkable.

An object of the present invention is to obviate the above mentioned disadvantages by providing a saw attachment on the bucket of a back hoe machine, which, in operation, will saw along parallel slits and chop an end slit in the frozen ground to enable lifting up of the strips so that digging is greatly facilitated and speeded without the necessity of employing a very large and expensive earth moving machine.

Another object of the present invention is to provide a novel method for uncovering and recovering the subsoil so that it remains in workable condition for an extended period of time.

A further object of the invention is to provide a novel attachment for cutting strips of lawn turf so that it can be transplanted in uniform sections.

A still further object of the invention is to use a single saw on one side of the bucket to saw off roots from the trunk of a tree, all around the tree, to enable easy and quick removal of tree stumps.

Other objects and advantages will become more apparent from a study of the following description taken with the accompanying drawing wherein.

Figure 1:
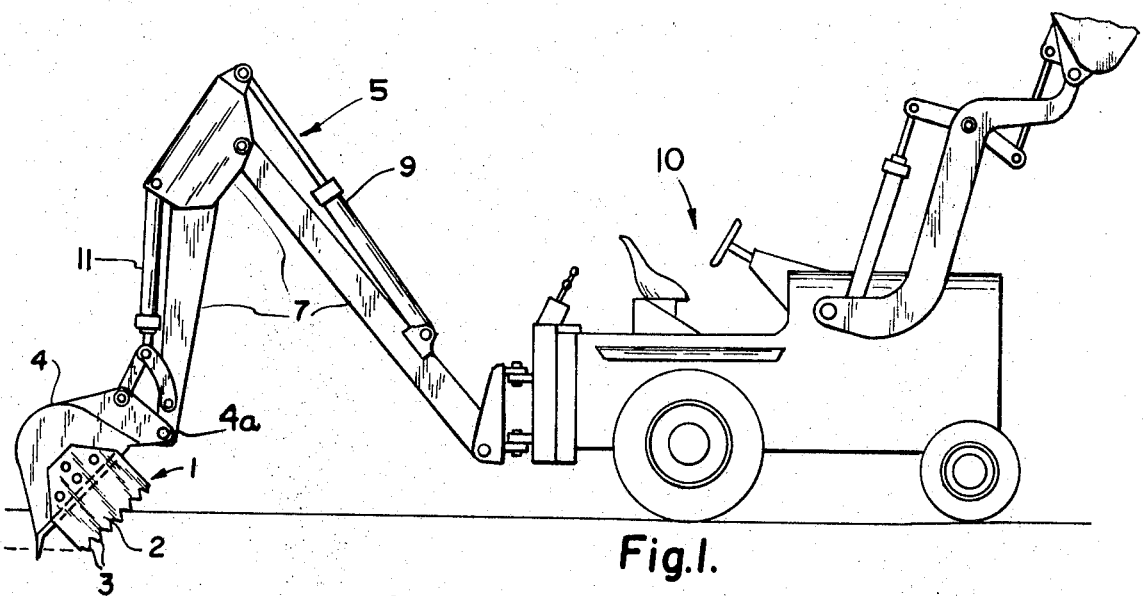
FIG. 1 is a side elevation view of a tractor having a back hoe with the saw attachment embodying the present invention.

Referring more particularly to FIG. 1 of the drawing, an earth moving machine or tractor, generally denoted by numeral 10, has a back hoe assembly, generally denoted by numeral 5, which includes pivotally connected boom portions or arms 7, hydraulic cylinder 9 and bucket 4. The blade attachments, generally denoted by numeral 1, form the subject matter of the present invention.

Figure 2:
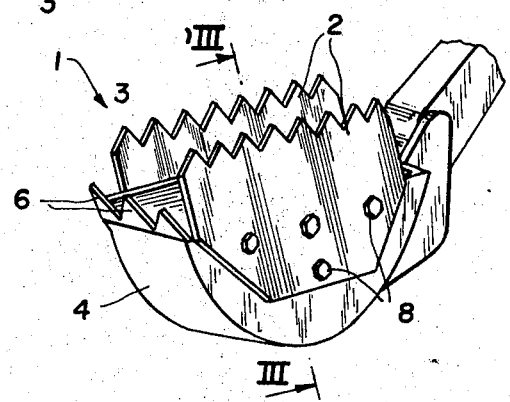
FIG. 2 is a perspective view of a back hoe bucket having the attachment shown in FIG. 1.
Figure 4:
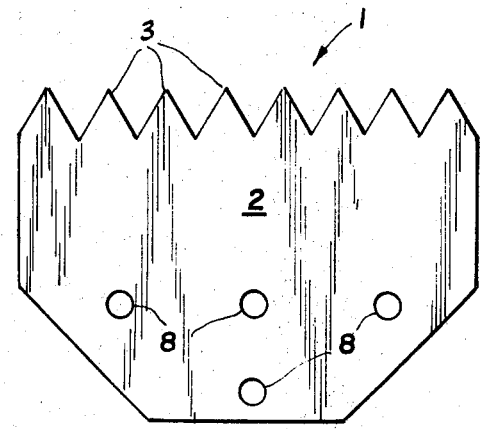
FIG. 4 is an enlarged, elevational view of the saw attachment shown in FIGS. 1 and 2.
Figure 3:
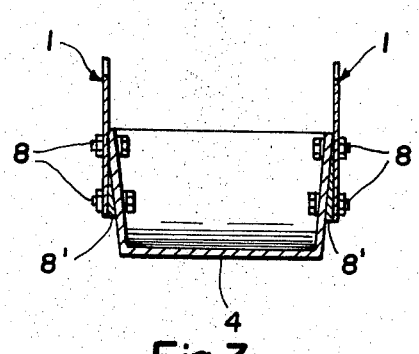
FIG. 3 is a cross-sectional view taken along lines III—III in FIG. 2.

As best seen in FIG. 2, bucket 4 has a plurality of scooping teeth 6 on its leading edge, as is well known in the art. In accordance with the invention, a pair of saw blades 2 are bolted or otherwise removably fastened in parallel relationship to either the outside or the inside of the sidewalls of bucket 4 by a plurality of bolts 8 or other suitable fastening means. A sufficient number of washers 8' may be used for buckets having tapered sidewalls as shown in FIG. 3 to insure that the blades 2 are fixed in a parallel relationship regardless of the amount of taper in the sidewalls.

Saw blades 2 are substantially rectangular in shape and made of tough steel or other suitable material. A highly satisfactory attachment may be made from ⅜ inch thick steel having an overall length of about 2 feet and an overall width of about 30 inches (measured to the point of saw teeth 3) with saw teeth projections of approximately 2 inches in height and 2 inch spacing between the teeth. It should be especially noted that the relatively large saw teeth described are very effective in sawing frozen ground and can saw for long periods of time without overheating and while taking large bites of the frozen ground. On the other hand, power driven circular saws with conventional small teeth would overheat rapidly when sawing frozen ground and would take much longer to saw. It should also be noted that the saw teeth 3 may be set, as in a saw, and may be of cross-cut design, rip-cut design or any other common teeth configuration, such as that used in large hand operated saws generally operated by two men in logging.

I have found that four holes of about ½ inch diameter, placed at the narrow edge of attachment 1 are sufficient to bolt blades 2 securely to bucket 4.

In operation, saw blades 2 are bolted onto the outer sides (or inner sides) of bucket 4 prior to digging a trench or ditch in frozen ground. By pivotally moving and inverting the bucket 4 by hydraulic cylinder or other power operated means 9 in a well known manner, the saw attachment 1 is thus positioned so that the two parallel disposed saw teeth 3 rest on the frozen soil. The back hoe bucket 4 is then made to pivotally turn slightly in opposite directions about pivot 4a as a center through the manual controls of the machine which cause the piston in hydraulic cylinder 11 to reciprocate so as to cause a sawing motion against the frozen earth when the teeth 2 are in the position shown in FIG. 1. In this way, long parallel slits are sawed in the soil in preparation for digging the trench.

After the slits have been cut, a cross-slit is chopped by using teeth 6 or merely by pounding away across the end from which the slits were initiated. The back hoe bucket 4 is then used to lift up said end of the cut strip and break off long sections of the frozen surface of the soil formed between the parallel slits to enable subsequent digging of the soil underneath to the desired depth.

If desired, the broken away frozen top soil sections can later be used to cover the areas that have been cut and exposed so that the lower layers of soil will not freeze and become unworkable.

Another useful application of this attachment is in uprooting and removing trees and stumps. In this instance, only one saw blade 2 is bolted in place on either side of bucket 4 prior to the tree or stump removal. Leading teeth 6 of the bucket when in substantially the position shown in FIG. 1 are initially used to dig radially outwardly from the trunk of the tree to remove the covering soil to clear and expose the roots near the surface of the ground. The saw attachment 1 is then utilized to cut the exposed root sections transversely around the entire base of the tree. When this is accomplished, it becomes a simple matter to lift the remaining tree portion with bucket 4 to complete the removal. This manner of tree removal is much safer than previous methods as it does not involve pushing by a bulldozer, involving a very heavy and expensive machine, where, as the result of pushing against the trunk or branches, the latter often spring back and strike the operator, thereby making the operation dangerous.

Still another useful application of this attachment is in cutting strips or rolls of lawn turf so that these strips may be used to provide long uniform sections or rolls of turf for transplanting or to provide ditches of uniform width having clean cut, parallel sidewalls.

Thus it can be seen that I have invented a very useful, simple and highly efficient saw attachment for any size bucket of an earth moving machine, such as a backhoe, which attachment has a wide variety of uses including slitting a trench in frozen ground, removing trees, transplanting lawn turf, and other uses.

I claim:

1. The method of digging a trench in frozen ground and recovering it by an earth moving machine having an earth scooping bucket which is tilted in opposite directions by power operated means, comprising mounting a pair of saw blades in parallel relationship on the sides of the bucket with their teeth pointing away from the bottom of the bucket, operating the back hoe so as to cause said teeth to rest on the ground, reciprocating said saw blades in opposite directions by said power operated means thereby sawing a pair of long parallel slits in the soil and fracturing one end of the sawed strip, lifting said end portion of the frozen soil between the slits by said bucket until a portion breaks off at the other end, setting aside said end portion of frozen soil, lifting an adjacent aligned portion of frozen surface soil and sliding it over to cover the subsurface ground strip exposed by removal of the initial portion and repeating this process until the entire trench has been uncovered and recovered.

2. In an earth moving machine having an earth scooping bucket with a curved bottom portion terminating in a front edge, flat non-parallel side portions diverging outwardly from said bottom portion and terminating in straight parallel edges at the mouth of the bucket, said straight parallel edges defining a first plane, digging teeth projecting from the front edge of the bucket and bridging said straight parallel edges, a pair of saw blades removably attached to said side portions by means of bolts, wedge-shaped washer means positioned on said bolts between said non-parallel side portions and said saw blades, said wedge-shaped washer means serving to position said saw blades parallel to each other, a plurality of saw teeth projecting from each said saw blade in a direction away from the curved bottom portion of the bucket and located on the side of said first plane opposite to the curved bottom portion, the tips of all the teeth of both said saw blades being in a common second plane parallel to said first plane, said saw teeth being at a distance from said straight parallel edges which is substantially greater than the length of said digging teeth so as to enable the bucket to saw frozen ground surface without interference from said digging teeth on said front edge.

References Cited

UNITED STATES PATENTS

| | | | |
|---|---|---|---|
| 1,650,255 | 11/1927 | Bannister. | |
| 2,652,641 | 9/1953 | Zowaski | 37—141 |
| 2,764,306 | 9/1956 | Dorkins | 214—510 |
| 3,286,377 | 11/1966 | Long | 37—118 |
| 3,403,940 | 10/1968 | Clark | 214—138 XR |

FOREIGN PATENTS 1,010,489   11/1965   Great Britain.

ROBERT E. PULFREY, Primary Examiner

C. D. CROWDER, Assistant Examiner

U.S. Cl. X.R.

37—2, 103, 141, 195; 214—138; 299—26, 67